INVENTOR.
JOSEPH J. RILEY
WILLIAM E. SHENK
BY
Teare, Teare & Sammon
ATTORNEYS

Jan. 20, 1970     J. J. RILEY ET AL     3,491,223
ROTATING THREE-PHASE POWER PACK FOR WELDING
Filed March 1, 1967     9 Sheets-Sheet 2

INVENTOR.
JOSEPH J. RILEY
BY    WILLIAM E. SHENK

*Teare, Teare & Sammon*

ATTORNEYS

INVENTOR.
JOSEPH J. RILEY
BY WILLIAM E. SHENK

*Teare, Teare & Sammon*

ATTORNEYS

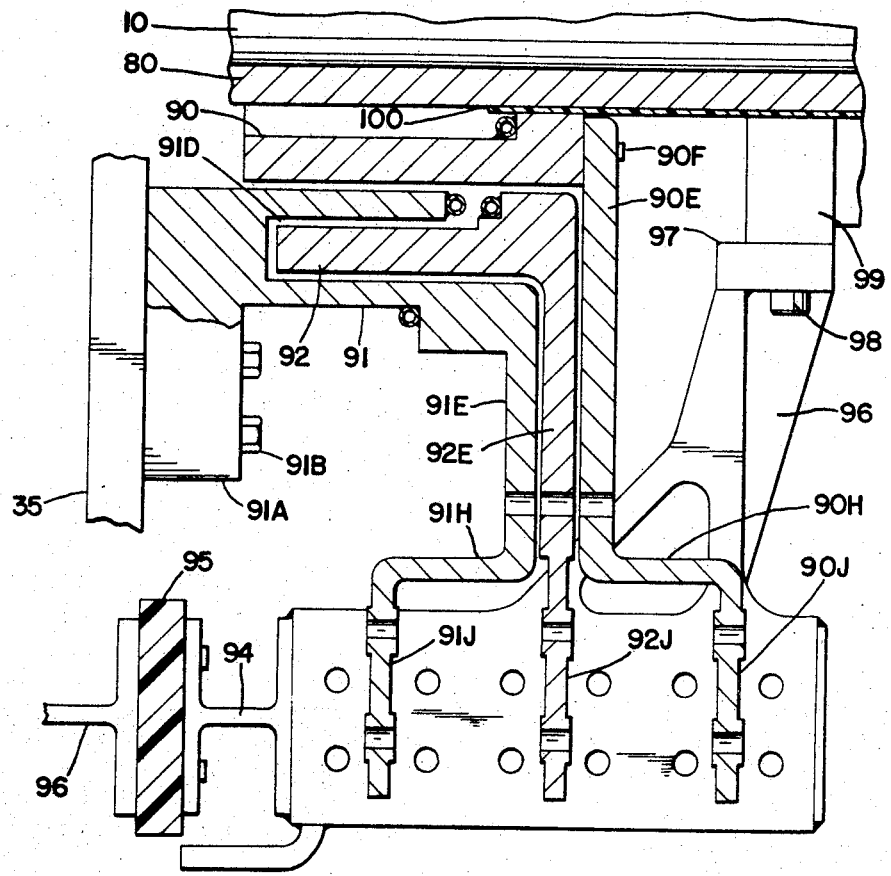
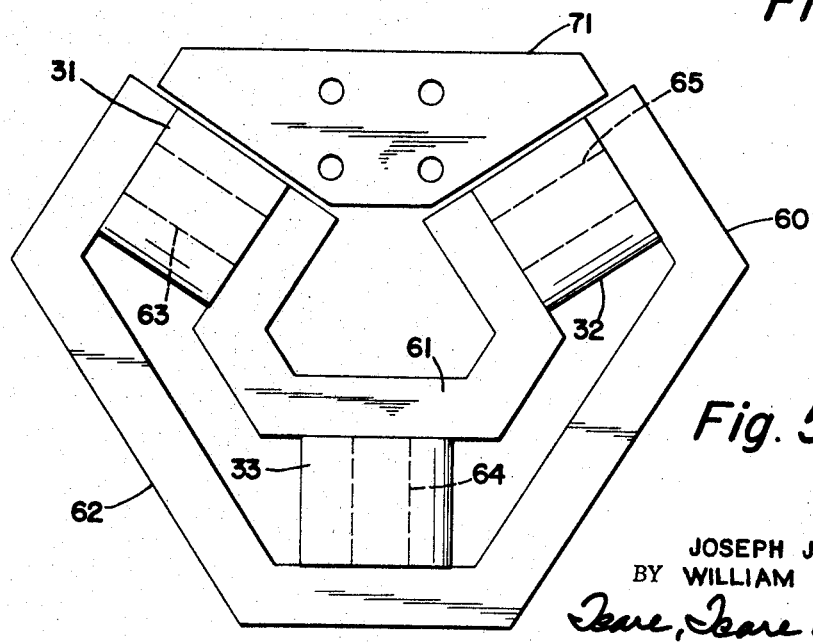

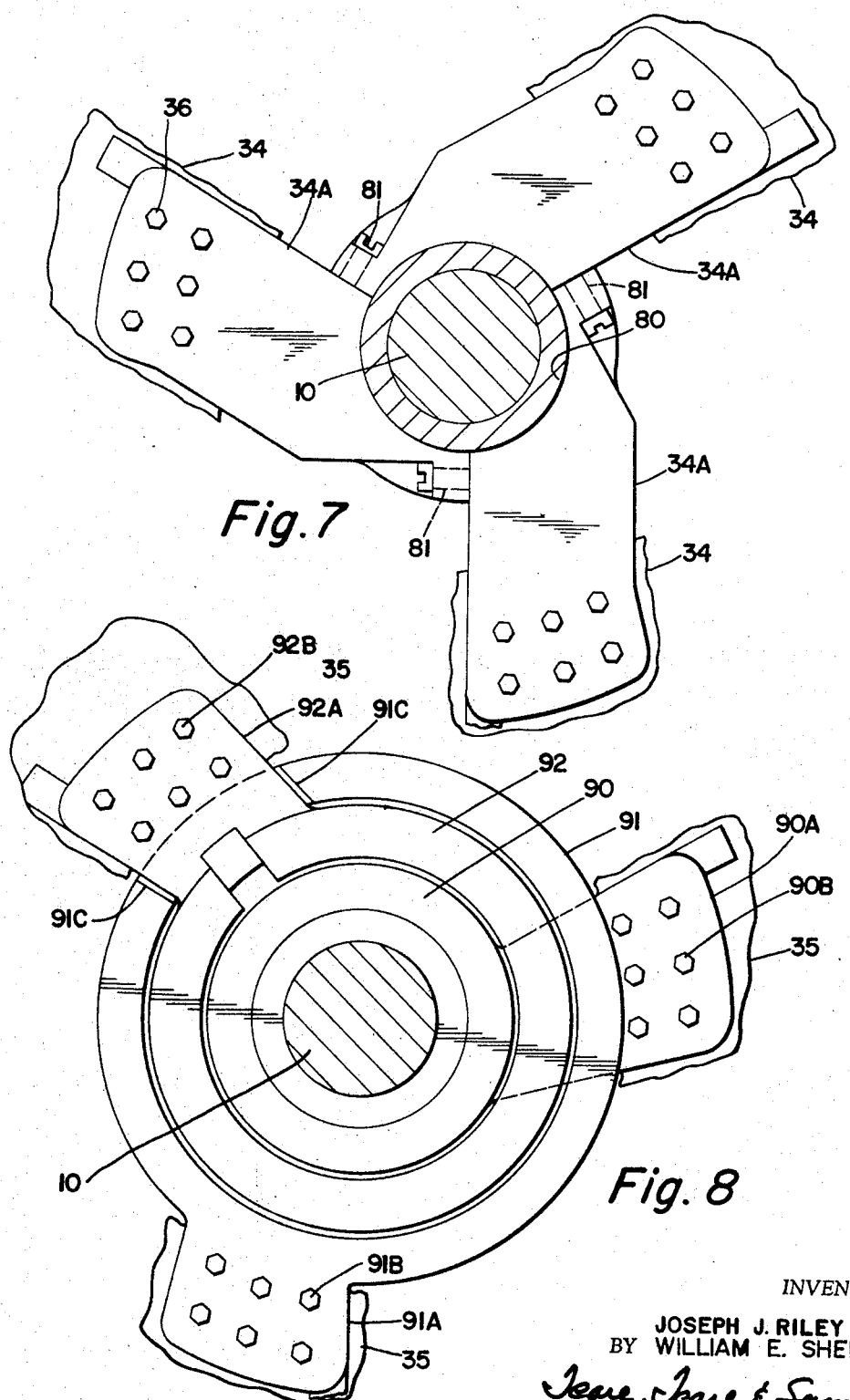

Jan. 20, 1970   J. J. RILEY ET AL   3,491,223
ROTATING THREE-PHASE POWER PACK FOR WELDING
Filed March 1, 1967   9 Sheets-Sheet 7

INVENTOR.
JOSEPH J. RILEY
WILLIAM E. SHENK
BY
ATTORNEYS

INVENTOR.
JOSEPH J. RILEY
BY WILLIAM E. SHENK

ATTORNEYS

Jan. 20, 1970  J. J. RILEY ET AL  3,491,223
ROTATING THREE-PHASE POWER PACK FOR WELDING
Filed March 1, 1967  9 Sheets-Sheet 9

INVENTOR.
JOSEPH J. RILEY
BY WILLIAM E. SHENK

ATTORNEYS

United States Patent Office 3,491,223
Patented Jan. 20, 1970

3,491,223
ROTATING THREE-PHASE POWER PACK FOR WELDING
Joseph J. Riley, Warren, Ohio, and William E. Shenk, Lambertville, Mich., assignors of one-half to The Taylor-Winfield Corporation, Warren, Ohio, a corporation of Ohio, and one-half to Abbey-Etna Machine Company, Perrysburg, Ohio, a corporation of Ohio
Filed Mar. 1, 1967, Ser. No. 619,802
Int. Cl. B23k 1/16, 11/30
U.S. Cl. 219—63
16 Claims

ABSTRACT OF THE DISCLOSURE

A rotating power pack for the conversion of three-phase electrical current to direct current to be used in the seam welding of the side seams of tubes, pipes and the like. The power pack unit comprises a main central shaft which is journaled for rotation in a supporting frame and which supports an alternating current collector ring assembly, a transformer assembly, a rectifier assembly and a welding wheel assembly. The power pack utilizes a three-phase, new and novel design folded core type transformer disposed around the axis of the central shaft and dynamically blanced while the rectifier is a three-phase half-wave type, the elements of which are closely grouped around the central shaft so as to achieve a symmetrical compact construction wherein the inertia value of the rotating mass is kept at a minimum. Silicon type rectifiers are utilized which are compactly mounted around the central shaft and in close balanced proximity to the secondary phase conductors, thereby achieving an efficient electrical circuit as well as a compact arrangement. Such construction also minimizes deflection at the weld wheels and balances the direct current through the silicon rectifiers by forming nearly equal impedance paths.

BACKGROUND OF THE INVENTION

Heretofore, welding apparatus embodying a stationary power pack has been utilized for resistance welding, with direct current but the cost and expense of maintaining bearings capable of continuously carrying 40,000 amperes or more has been an objectionable characteristic. An effort has been made to overcome such difficulty by utilizing a transformer and rectifying power pack mounted on a rotating shaft, which is journaled in roller bearings and which supports the welding wheels, but, in general, such arrangement which would be adequate to deliver 40,000 amperes or more at the welding wheels has previously resulted in a structure which possesses exorbitant size and length and has resulted additionally in a high rotating mass and deflection at the weld wheels.

SUMMARY OF THE INVENTION

The present invention overcomes the objections present in previously known rotating transformer and rectifier packs for welding apparatus by utilizing a three-phase transformer of a new and novel designed folded core type, wherein the secondary phase conductors have elongated cylindrical portions which are mounted in concentric relationship about the central shaft and wherein the rectifying units are evenly distributed around the shaft in close proximity to the phase conductors, whereby the distance between the tapered roller bearings which support the shaft is minimized and whereby the inertia value of the rotating mass is greatly reduced. Additionally, such arrangement of the secondary phase conductor elements and the rectifier units assures complete balance about the axis of the shaft and also maintains a balanced electrical load. The rectifier utilizes silicon rectifying units, while the arrangement of them with reference to the conductors, and of the conductors themselves, achieves low impedance. The apparatus is cooled by providing a water distributing manifold which acts as a hub for the alternating current collector rings, and from which hub suitable hose connections lead to and from the various parts which require cooling. Cooling liquid is introduced at one end of the central shaft and is exhausted at either or both ends of said shaft.

DESCRIPTION OF DRAWINGS

FIG. 5 is an end view of the transformer folded core and associated primary coils;

FIG. 7 is a section taken on a plane indicated by the line 7—7 in FIG. 3 but showing one set of connections to one of the terminal pads of each phase of the three phase transformer, effectively forming the neutral connection;

FIG. 8 is a vertical section taken on the line 7—7 of FIG. 3 but showing the connections of the phase rings to the other terminal pads of the respective transformer secondary sections;

FIG. 9 is a vertical section partly in elevation showing the interleaving arrangement of the secondary phase bars or members, the section being similar to a portion of that shown in FIG. 3 but on an enlarged scale;

DESCRIPTION OF THE PREFERRED EMBODIMENTS

Figure 1:
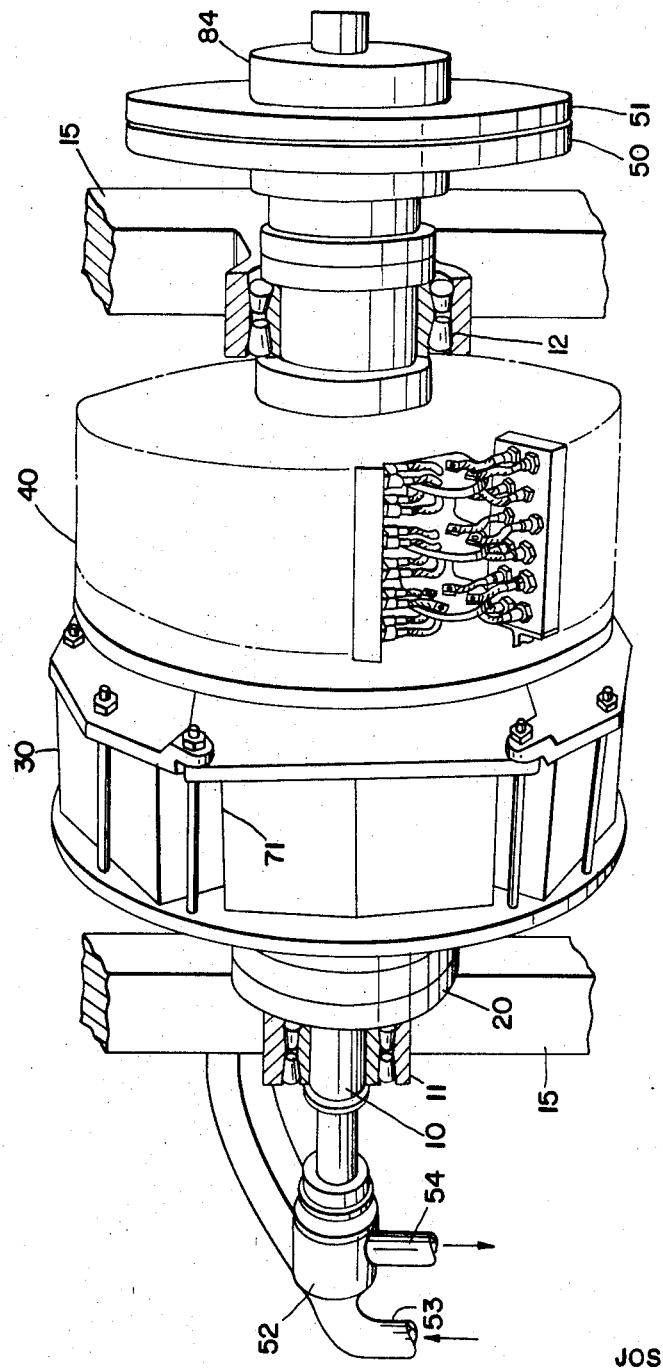
FIG. 1 is a perspective view partly in section of a unit embodying the present invention as viewed from one side.

The invention is indicated in general in FIG. 1 as comprising a central shaft 10 which is journaled in bearings 11 and 12, respectively, which are preferably of the tapered roller type and which are mounted upon a supporting structure such as a frame 15. The frame in turn may be supported in any suitable way for vertical movement with respect to the floor upon which the machine is mounted but the frame and its associated apparatus form no part of the present invention. The shaft supports a collector ring assembly 20, a transformer assembly indicated in general at 30, a rectifier assembly indicated in general at 40 and two welding wheels or electrodes 50 and 51 respectively. The assemblies 20, 30 and 40 are disposed between the bearings 11 and 12 while the welding wheels are disposed outside the bearing 12. On the opposite end of the shaft, and outside bearing 11, is shown a coupling 52 for the distribution of the cooling fluid. The coupling may be supported in any convenient manner to the support 15 and is adapted to receive the end of the shaft 10 which rotates within the coupling 52. Cooling liquid may enter a pipe 53 and be conducted through and around the parts to be cooled and thence discharged through the pipe 54. The complete assembly may be rotated in any suitable way through an extension of shaft 10 as is well known in the art.

Figure 3:
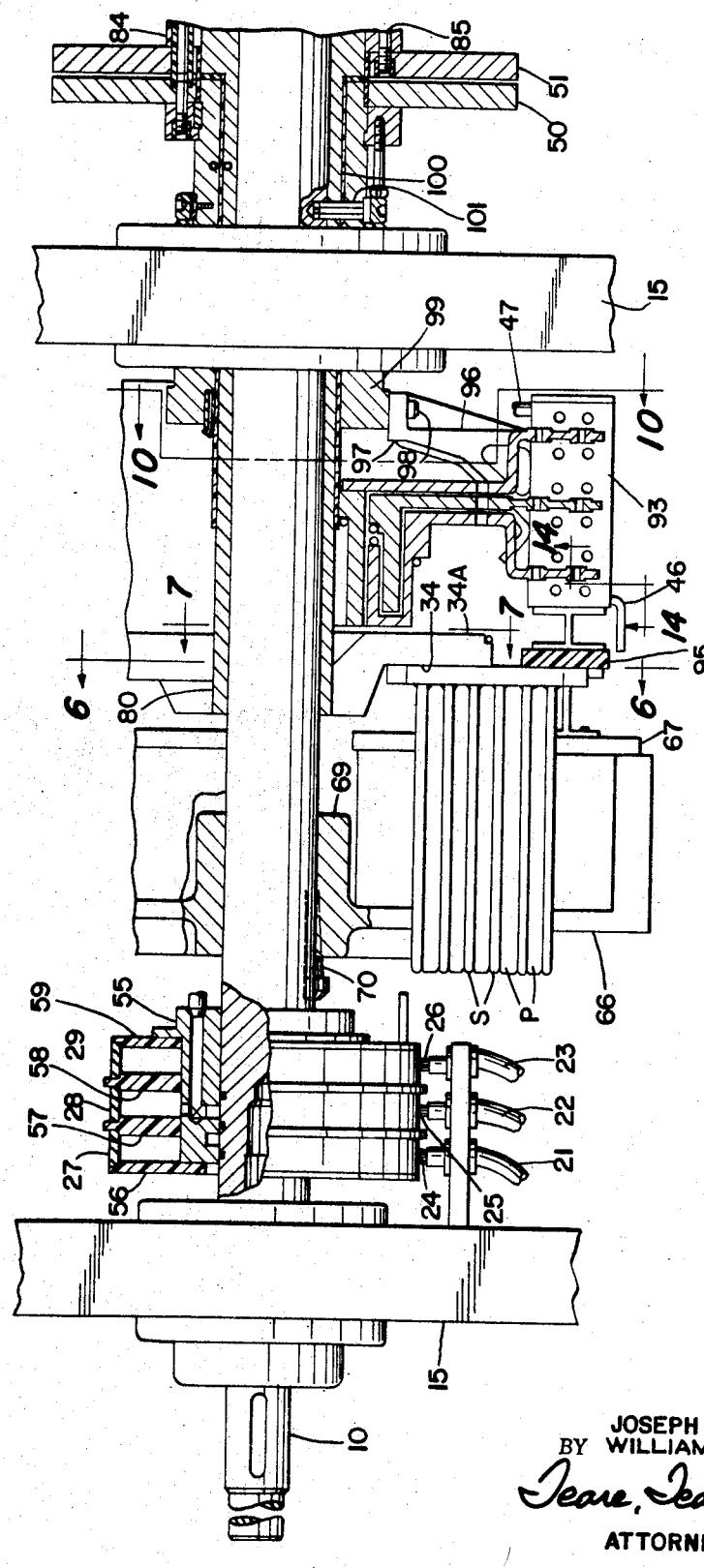
FIG. 3 is a longitudinal vertical section partly in elevation of a unit embodying the invention.

The present invention is concerned with a power pack which utilizes three-phase alternating current as a source of supply which may be conducted to the unit through flexible conductors 21, 22 and 23 as shown in FIG. 3. The conductors are adapted to be connected to suitable brushes 24, 25 and 26 which bear against collector rings 27, 28 and 29, respectively.

The collector ring assembly includes a hub 55 which is fixed to the shaft and is rigidly connected to the respective collector rings by discs of electrical insulating material 56, 57, 58 and 59, respectively.

Figure 2:
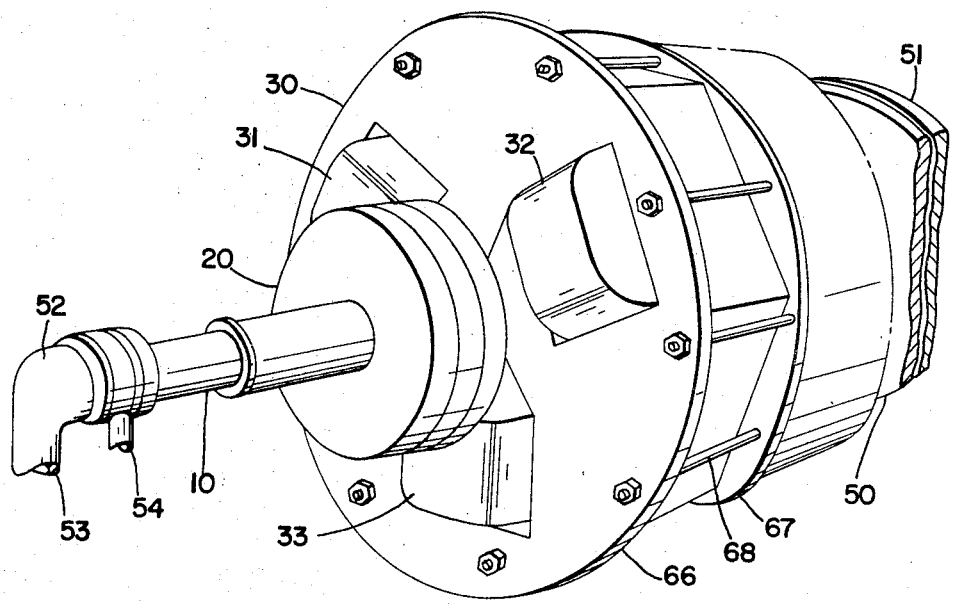
FIG. 2 is a perspective view of the unit shown in FIG. 1 as viewed from the slip-ring end, but showing the unit removed from the supporting structure.

The transformer assembly includes three coils indicated in general at 31, 32 and 33, respectively (FIG. 5), which are disposed equidistantly around the axis of the shaft 10 and are mounted upon radially extending arms of a core 60. The core is made of laminations which are sectional, so as to be interfitted to provide a new and novel designed folded core shape shown in FIG. 5. The inner and outer legs of the core, which are common to all three primaries and secondaries would be made circular and concentric with the rotating shaft axis without changing the scope of the invention. A circular core would entail a high tooling and waste material cost. My folded core uses core iron leaves of straight cut sections which can be sheared to shape in a conventional shear, whereby waste material is practically negligible. The core thus formed has generally C-shaped legs 61 and 62 respectively, as viewed in FIG. 5, and coil receiving legs 63, 64 and 65, respectively. The core and its associated coils are shown as being held in position between supporting plates 66 and 67 by bolts 68, as shown in FIG. 2. The plate 67 may be provided with a hub 69 which may be keyed to the shaft, as at 70, as shown in FIG. 3.

A counterweight 71 (FIGS. 1 and 5) may also be bolted to the plates 66 and 67 for dynamically balancing the transformer about the axis of the shaft 10.

Figure 4:
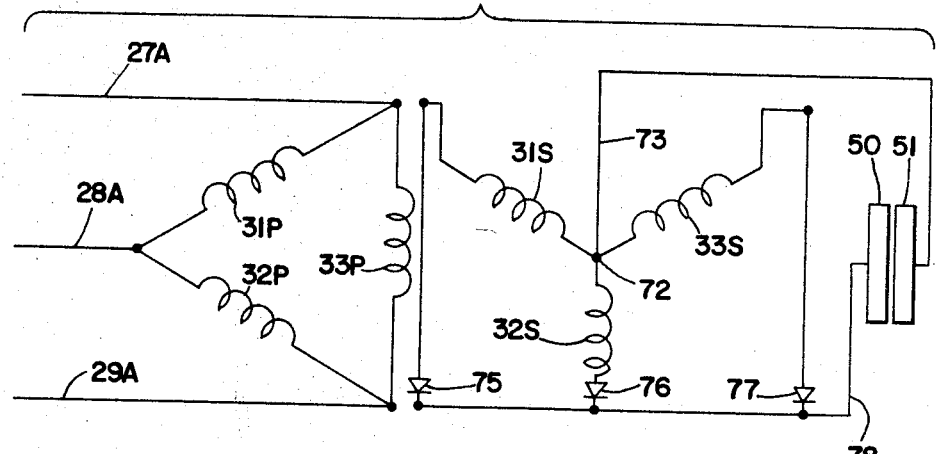
FIG. 4 is an elementary schematic diagram of the transformer and rectifier assembly with connections from the source of supply to the welding wheels.

FIG. 4 shows a wiring diagram wherein the primary coils are indicated in general at 31P, 32P and 33P as being delta connected to suitable conductors 27A, 28A and 29A which are respectively electrically connected by suitable conductors to the rings 27, 28 and 29, as shown in FIG. 4.

The secondary coils are shown as being Y connected and are indicated in FIG. 4 at 31S, 32S and 33S respectively. One end of each secondary coil is connected, as at 72, to a conductor 73 which is then electrically connected to one of the welding wheels 51, while the opposite ends of the respective secondary coils are connected through rectifiers, such as silicon rectifiers indicated in FIG. 4 at 75, 76 and 77, respectively, to a common conductor 78 which, in turn, is electrically connected to the welding wheel 50.

Figure 6:
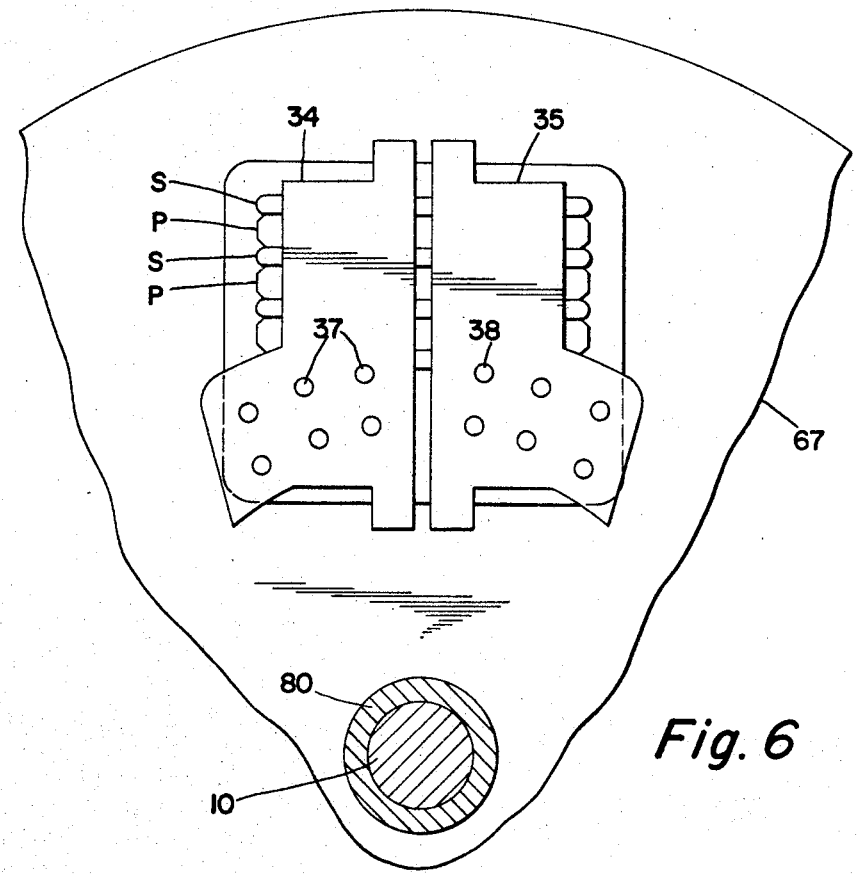
FIG. 6 is a vertical section taken on the line 6—6 in FIG. 3 and showing the secondary terminals for one transformer but on a scale larger than that in FIG. 3.

Each transformer coil is shown as having primary windings P interleaved with secondary windings S, the latter of which are generally C-shaped and are electrically connected together at their respective ends by terminal pads in the form of plates 34 and 35, respectively (FIG. 6), so that the secondary windings are of the one-turn type. The terminal pads are electrically insulated from each other and are secured to the ends of the secondary windings as by a welding operation. The size and number of turns of the primary and secondary windings may be selected, as is well known in the art, to produce the desired amperage at the welding wheels. In practice, the size may be varied, but, by way of illustration, one size contemplates production of about 40,000 amperes direct current at a voltage of 1½ to 3 volts at the welding wheels with an input voltage at the collector rings of about 600 volts three-phase alternating current.

In FIGS. 3 and 7, the common conductor, indicated at 73 in FIG. 4, comprises a sleeve 80 which surrounds the shaft 10 and carries arms 34A which extend radially from the sleeve and are rigidly connected to the sleeve and to each other as by threaded securing members 81. The arms 34A are in turn electrically connected to the respective pads 34, preferably by cap screws 36 which engage threaded openings 37 in the pads. The opposite end of the sleeve 80 is then electrically connected to the welding wheel 51 in any suitable way, as by a cap 84 which may be fastened to the wheel by suitable cap screws 85. It is to be understood that the wheels are electrically insulated from each other.

The electrical connections between the respective secondary coils and the welding wheel 50 are made by electrically conductively connecting each secondary terminal pad 35 to a phase ring or conductor the latter of which are electrically connected to rectifier units for half-wave rectification. In the present embodiment of the invention, three phase rings or members are indicated in FIGS. 3, 8 and 9, at 90 as an inner ring or sleeve, at 91 as an outer ring or sleeve and at 92 as an intermediate ring or sleeve. The sleeves are concentric to the shaft and are electrically insulated from the sleeve 80 and from each other by any suitable electrical insulating material. Each ring is electrically connected to one of the pads 35 and for such purpose, as shown in FIG. 8, the inner ring 90 has a radially extending arm 90A which is adapted to be electrically connected to a pad 35 of coil 31S, as by cap screws 90B, which are adapted to engage threaded openings 38 in the pad. Similarly, the outer ring 91 has a radially extending arm 91A which may be attached to a pad 35 of coil 32S by cap screws 91B, while the intermediate ring 92 has an arm 92A which may be fastened to the pad 35 of coil 33S, by cap screws 92B.

To facilitate assembly of the phase rings, the outer ring 91 has a relief 91C therein to admit the arm 92A. Additionally, as shown in FIG. 9, the outer ring 91 has an annular channel 91D into which the intermediate ring 92 extends, thus enabling each ring to be connected to one of the pads 35, while still allowing the rings to be mounted in interleaving relationship with respect to each other to obtain low reactance. Each phase ring, at its end opposite the pads 35 has a radially extending conductor in the form of a spider-like plate projecting outwardly as indicated in FIG. 9 at 90E, 91E and 92E, respectively, which may be integral with or fastened to its associated ring in any suitable manner. Such arrangement results in substantially equal impedance.

To facilitate assembly, the plates 91E and 92E may be either integral with or welded to the rings 91 and 92, respectively, while the plate 90E may be attached to the ring 90 by cap screws 90F.

Figure 10:
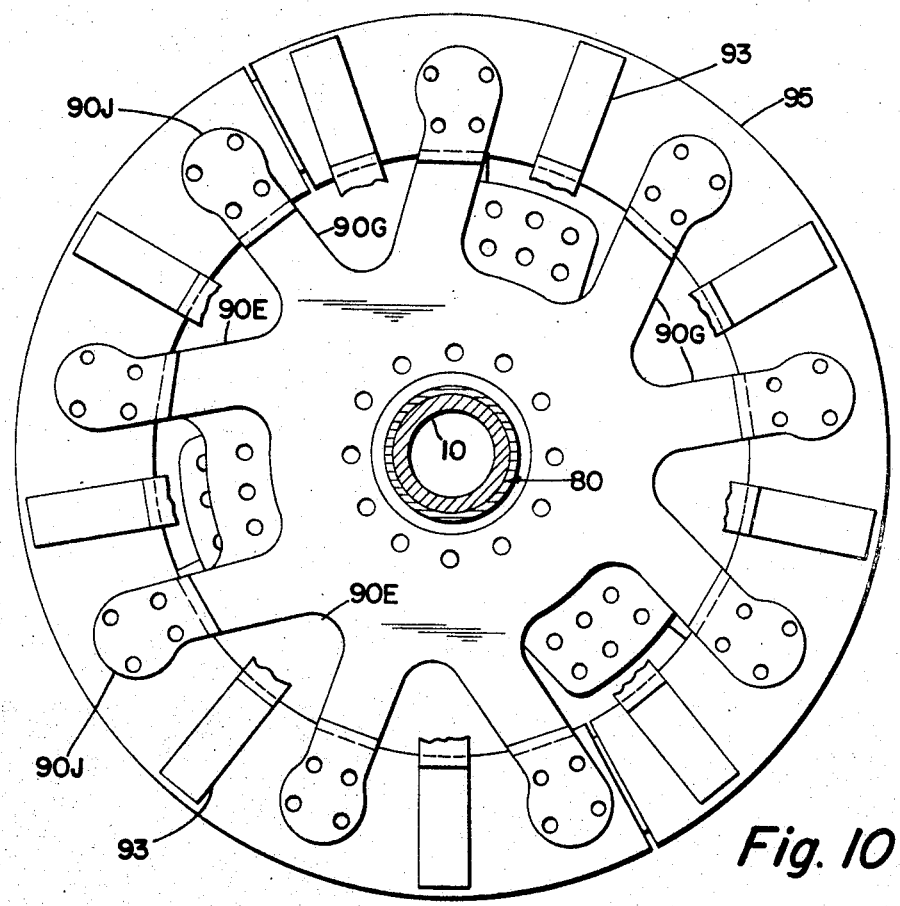
FIG. 10 is a section taken on a plane indicated by the line 10—10 in FIG. 3.
Figure 11:
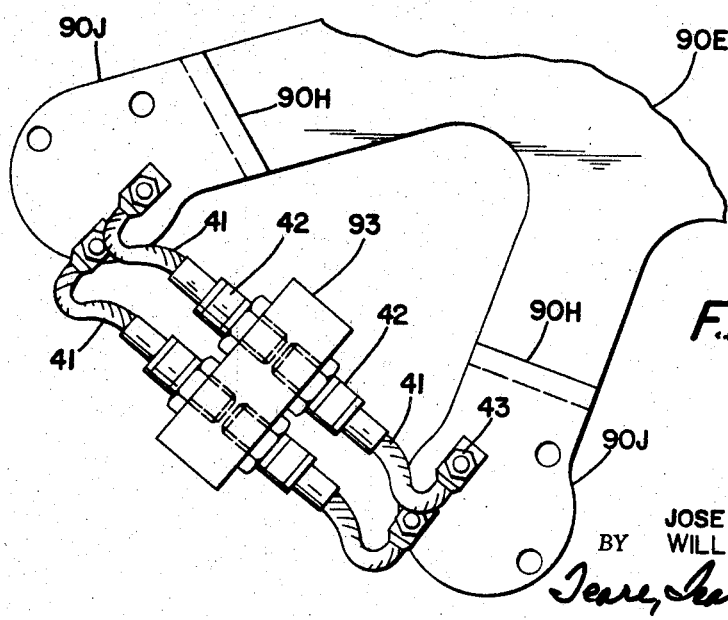
FIG. 11 is a partial end view of one of the phase bars showing the connections to the rectifier diodes.

FIG. 10 shows the phase bar 90E in the form of a disc with radially extending arms 90G projecting therefrom. As shown in FIG. 9 each arm is offset at 90H so that a terminal portion 90J is spaced apart from the terminal portion 92J, to provide sufficient space for attaching the anode pigtails 41 of rectifier units 42. Such units are preferably silicon rectifiers. Each pigtail 41 may be electrically connected to a phase bar finger as indicated at 43 in FIG. 11.

The phase bar 91E may be offset as at 91H in a manner similar to that indicated at 90H in FIG. 9 so that its terminal portion 91J is spaced from the terminal portion 92J by an amount equal to the spacing of the terminal portion 90J from the outer end of the phase bar 92E. Such construction provides a spacing arrangement by means of which the pigtails 41 may all be of substantially the same length.

Each silicon rectifier 42 has a cathode in the form of a threaded shank by means of which it may be electrically connected to a conductor 93, it being understood that although nine such conductors are shown, other numbers may be employed. In each case, however, the conductors 93 are alternately and equidistantly positioned between the ends of the phase bars, as shown in FIG. 10. As shown in FIGS. 1 and 9, the terminal portions of th phase bars are in axial registration, thereby providing adequate space in which the conductors 93 may be positioned.

Figure 12:
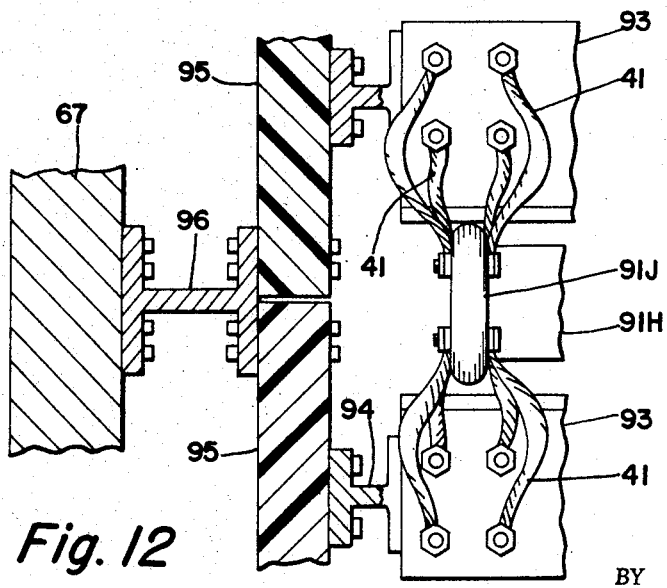
FIG. 12 is a partial plan and sectional view showing connections between the phase bar and the rectifying diodes.
Figure 14:
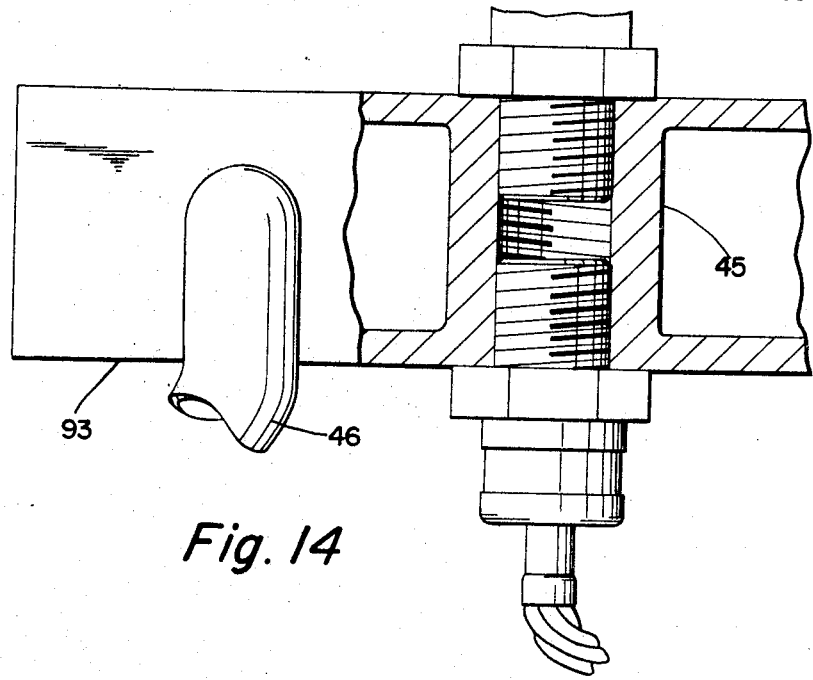
FIG. 14 is a vertical section through rectifier diode support.

Each conductor 93 preferably comprises a hollow box-like member or pad which is supported adjacent one end by a bracket 94 (FIG. 9) which in turn is attached to a ring 95 of electrical insulating material. As shown in FIG. 12 the ring 95 is sectional and may be supported by means of brackets 96 which are connected to the transformer plate 67. As shown in FIG. 14 each conductor 93 may have multiple bosses 45 so that rectifier diodes may be connected to opposite sides of the conductor and may be cooled by water or other cooling fluid, which enters one end of each member 93 at 46, flows around each boss, and flows out from the other end at 47, see FIG. 3. Each conductor 93 is also provided with a radially extending arm 96 (FIG. 3) the end 97 of which is connected as by threaded fasteners 98 to a sleeve 99, the latter of which is concentric with the sleeve 80 but is electrically insulated therefrom as indicated at 100 in FIG. 3. The sleeve 99 is electrically connected to the wheel 50.

To prevent relative rotation of the conductor sleeves 80 and 99 with respect to the shaft and with respect to each other, an epoxy or equivalent cement may be applied between the two conductors but, for further assurance against relative rotation, the parts may be connected together by means of a ceramic or electrically insulated dowel 101, as shown particularly in FIG. 3.

Figure 13:
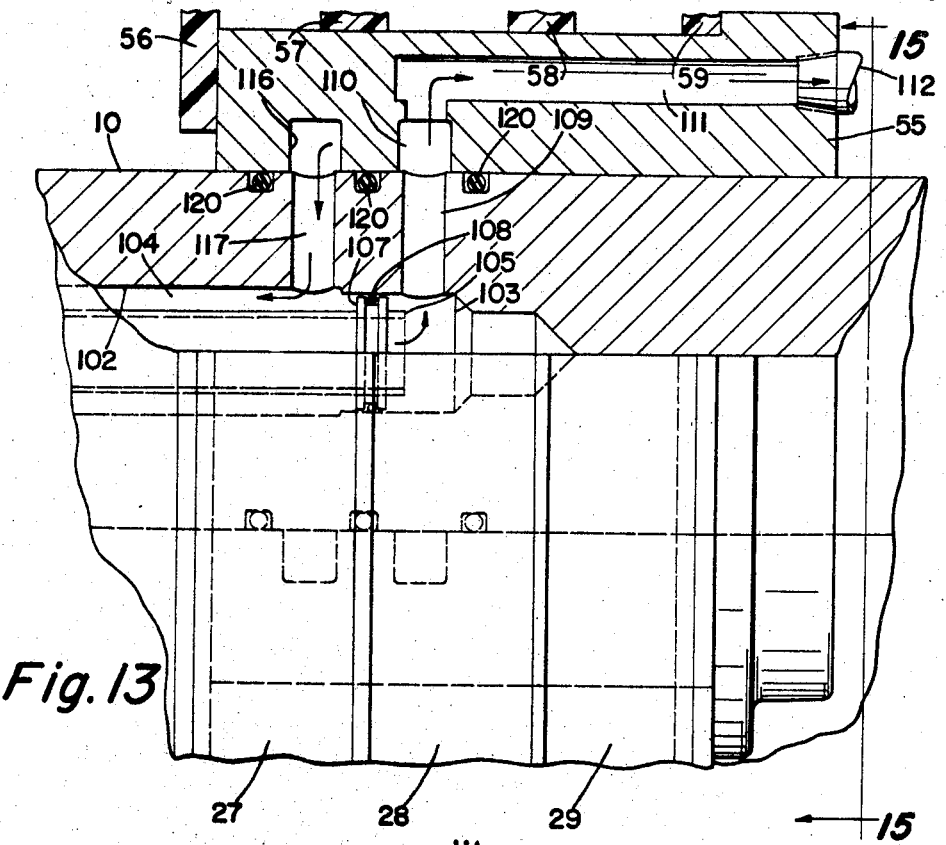
FIG. 13 is an enlarged sectional view of a portion of FIG. 3 to illustrate the coolant manifold which forms part of the collector ring assembly.
Figure 15:
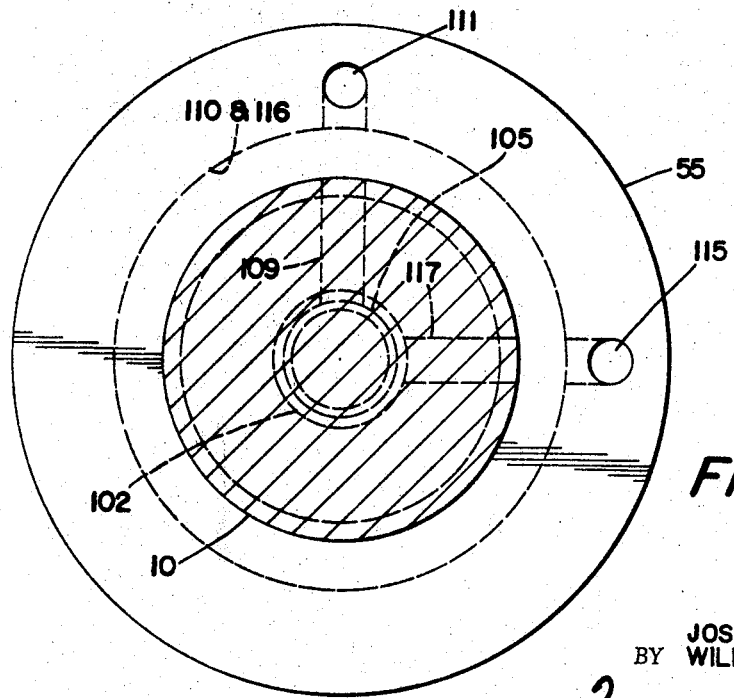
FIG. 15 is a section taken on the line 15—15 in FIG. 13.

The present invention as shown in FIG. 13 utilizes the hub portion of the collecting ring assembly as a manifold for enabling the liquid coolant, such as water, to be readily circulated by suitable conduits to all parts of the structure which require cooling for efficient operation. Thus, the cooling liquid entering the coupling 52 may flow through a pipe 105 which extends axially through a bore 102 in the shaft 10. The pipe carries a piston-like collar 107, which may be sealed with an O-ring 108, to define chambers 103 and 104. Liquid flows, as shown by the arrows in FIG. 13 from the pipe 105 into chamber 103 and then through a radial passageway 109 in the shaft, from whence the coolant enters an annular groove 110 in the hub or sleeve 55. Such groove is in communication with an axially extending passageway 111 to which a hose 112 may be connected. There may be other passageways 111 in communication with the groove 110, as desired, for transmitting cooling liquid to the various respective units.

The coolant may be returned from the respective parts of the assembly through one or more conduits to one or more axially extending return passageways 115 in the hub 55, where the liquid is conducted to an annular groove 116 and thence through a radially extending passageway 117 to the chamber 104 from whence it flows to the discharge pipe 54 in the coupling 52. Suitable O-ring seals 120 may be employed to prevent seepage of the cooling liquid along the surface of the shaft 11.

An advantage of a rotating power pack transformer unit embodying the present invention is the fact that the machine may be kept as small and compact as possible, thereby minimizing deflection at the weld wheels and also maintaining the size of the rotating mass at a minimum. Additionally, the arrangement of the water cooling distributor, transformer and rectifier, as illustrated and described, maintains the length of the shaft between the bearings at a minimum. The grouping of a core-type transformer together with rectifier components around a central shaft results not only in an efficient and symmetrical electrical circuit, but also in a construction which minimizes the horsepower necessary to drive the unit.

We claim:
1. An electrical welding machine, having a support, a shaft mounted for rotation in said support, a three-phase core type transformer supported by the shaft for rotation therewith, said transformer including three primary windings and three secondary windings, three collector rings carried by the shaft, there being electrical conductors connecting the collector rings to the primary windings, there being also an electrically conductive member mounted on and surrounding the shaft and electrically connected to one end of each of the three secondary windings, an electrode in the form of a wheel electrically connected to said member, three interleaved electrical connectors mounted on and surrounding the shaft but electrically insulated from the shaft and from each other, said connectors being respectively electrically connected to the other terminals of the secondary windings, each connector having a radially extending conductor electrically connected thereto, a plurality of current carrying pads mounted for rotation with the shaft, rectifying elements each having its anode electrically connected to one of the radially extended conductors and having its cathode electrically connected to one of said pads, a second electrically conductive member mounted on the shaft and electrically insulated therefrom, a second electrode in the form of a welding wheel electrically connected to the second member, and means for electrically connecting said pads to the second member.

2. An electrical welding machine according to claim 1, wherein the first electrically conductive member has a radial flange from which arms extend outwardly and are utilized for making an electrical connection with one end of each of the three secondary windings.

3. An electrical welding machine according to claim 1, wherein the core of the transformer extends partially around the shaft and has a space between the ends of the core, and wherein a counterweight is carried by the transformer in such space to balance the transformer dynamically.

4. An electrical welding machine according to claim 1, wherein each interleaved electrical connector has a pad extending radially from one end thereof for making electrical connection with one terminal of a secondary winding, and wherein each interleaved electrical connector has spaced fingers to which the anodes of the rectifying elements are connected.

5. An electrical welding machine according to claim 1, wherein the terminal portions of each radial conductor are equally spaced apart axially in axial registration and wherein the current carrying pads are positioned midway between adjacent sets of terminal portions of the radial conductors, whereby the connections between the rectifying elements and the respective points of connection to the radial conductors are substantially equal.

6. An electrical welding machine according to claim 1, wherein the rectifying elements are attached to opposite sides of the current carrying pad and wherein the rectifying elements which are positioned on one side of a pad are electrically connected to the terminal portions of the radial conductors which are nearest to such side of the pad and wherein the rectifying elements connected to the opposite side of the pad are electrically connected to the terminal portions of the radial conductors which are nearest to such opposite side of the pad.

7. An electrical welding machine according to claim 6, wherein the terminal portions of the radial conductors terminate in planes extending substantially parallel to each other and wherein the pads disposed between the terminal portions have substantially parallel faces lying in planes normal to the plane of the terminal portions, each pad having multiple pairs of rectifying elements electrically connected thereto on each face, and each circular conductor having two of said pairs electrically connected thereto.

8. An electrical welding machine according to claim 1, wherein the collector rings are supported on a hub, and wherein the hub has spaced passageways therein comprising manifolds, there being connections to some of the manifolds for transferring cooling liquid to another part of the machine and connections to other of the manifolds for collecting the return liquid, said shaft having an axially extending passageway therein and having radially extending passageways providing communication between the axially extending passageway in the shaft and the respective manifolds in the collector ring hub.

9. An electrical welding machine according to claim 1, wherein an electrically insulated dowel extends radially through the electrically conductive members and into the shaft to prevent rotation of the members with relation to the shaft, and with relation to each other.

10. An electrical welding machine according to claim 1, wherein each rectifier supporting pad comprises a hollow box-like member and wherein bosses are provided for the interior of the pad for receiving the rectifying elements, the bosses being spaced apart to provide a path for the flow of cooling liquid therebetween.

11. An electrical welding machine according to claim 1, wherein the primary windings are delta connected, and the secondary windings are Y connected and wherein the rectifying elements comprise half-wave rectifiers.

12. An electrical welding machine according to claim 1, wherein one of the three interleaved electrical connectors has a concentric annular recess into which one of the other electrical connectors extends, but is electrically insulated therefrom, said interfitting relationship operating to reduce the reactance between the phases represented by such two connectors.

13. An electrical welding machine according to claim 1, wherein the transformer core has inner and outer legs which extend in a peripheral direction with respect to the shaft and has spaced coil supporting legs which connect the inner and outer legs and extend generally radially of the shaft.

14. An electrical welding machine according to claim 13, wherein the core laminations comprise interleaved strips which when assembled provide a generally C-shaped core, and wherein a counterweight is carried by the shaft for dynamically balancing the transformer core and is disposed in the space between the ends of the core.

15. An electrical welding machine according to claim 8, wherein a second passageway is provided in the shaft and is disposed coaxially with the axially extending passageway, one of said passageways operating to conduct cooling liquid into the machine and the other operating to conduct return cooling liquid from the machine.

16. An electrical welding machine according to claim 1, wherein said radially extending conductors are of substantially equal impedance.

References Cited

UNITED STATES PATENTS

| | | | |
|---|---|---|---|
| 3,102,943 | 9/1963 | Shenk | 219—63 |
| 3,130,290 | 4/1964 | Keska | 219—63 |

JOSEPH V. TRUHE, Primary Examiner

BARRY A. STEIN, Assistant Examiner